T. F. BALDWIN.
VEHICLE TIRE SHOE.
APPLICATION FILED FEB. 26, 1910.
986,670.
Patented Mar. 14, 1911.
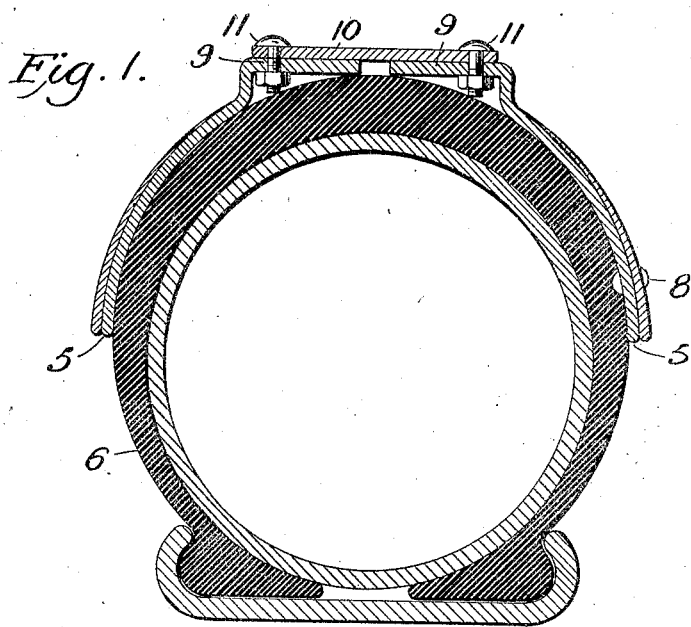
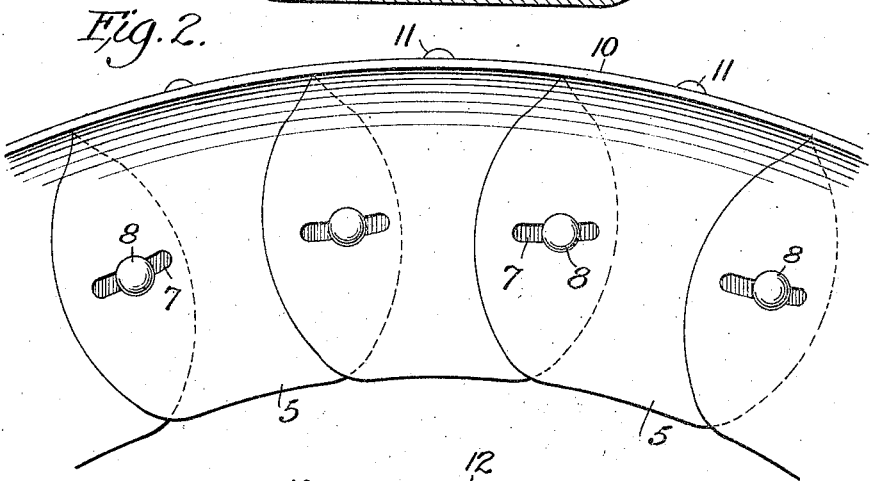
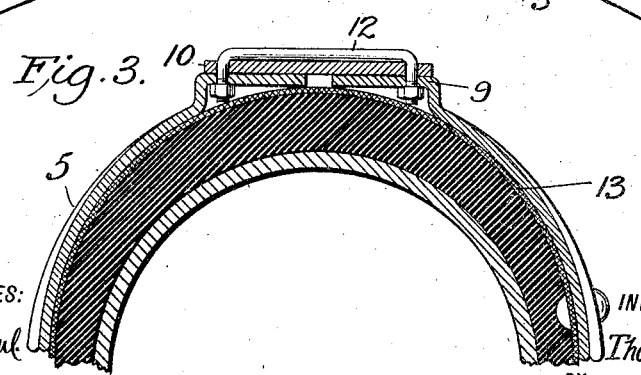
WITNESSES:
INVENTOR
Thomas F. Baldwin,
BY Victor J. Evans
ATTORNEY

UNITED STATES PATENT OFFICE.

THOMAS F. BALDWIN, OF NEW YORK, N. Y.

VEHICLE-TIRE SHOE.

986,670.  Specification of Letters Patent.  Patented Mar. 14, 1911.

Application filed February 26, 1910. Serial No. 546,138.

*To all whom it may concern:*

Be it known that I, THOMAS F. BALDWIN, a citizen of the United States, residing at New York, in the county of New York and State of New York, have invented new and useful Improvements in Vehicle-Tire Shoes, of which the following is a specification.

This invention relates to shoes for vehicle tires and consists of a flexible shield adapted to be fitted about the wearing surface of a tire and be connected to a band of metal to which the sections may either be riveted, bolted or held in place by transverse or diagonal bolts which act as bearing surfaces to create a certain amount of friction and prevent the wheel from slipping or skidding. These and other objects and details of the invention are more fully set forth in the accompanying specification, set forth in the claims and illustrated in the drawings, wherein:

Figure 1 is a cross section of a tire showing the shoe in place. Fig. 2 is a side elevation of a portion of the shoe. Fig. 3 is a modified form of the shoe and the manner of securing it to the wheel.

This shoe is made up of a series of plates, of a shape such as will permit each section 5 to fit substantially one quarter of the circumference of the tire 6 and overlapping each other as shown in Fig. 2, each section having a slot 7 for the reception of the pin 8 from the rear end of the section beneath so that the said sections will be linked together around the entire sides of the tire. The outer edge 9 of each section is secured to a circular strap 10 which is made of one or more pieces and is adapted to pass around the circumference of the tire and act as a tread for the said tire. As shown in Fig. 1, the sections are secured to the band 10 by means of bolts 11 having nuts 12 on their inner ends and adjacent to the outer surface of the tire. Each section is provided with one bolt 11 and is secured to its adjacent sections in such a way that its movement is practically free to allow for the action of the tire as it is compressed by the weight of the vehicle. Each section is identical and they are readily removed or replaced without interfering with the other sections.

In the modified form shown in Fig. 3 the sections are secured to the band 10 by means of elongated bolts, each bolt being adapted to secure the sections covering opposite sides of the tire and the main portion 12 of this bolt projects above the surface of the band 10 where it may be found useful in damp or icy streets and at the same time it bites into the pavement to a sufficient degree to prevent slipping or sliding of the wheel. In the latter figure a covering 13 of leather or other material is interposed between the tire and the sections in order to prevent any injurious action on the tire by the sections or the band.

It is obvious that other modification may be resorted to in the construction of this tire and the arrangement and the attachments of the sections, without departing from the essential features above described.

What I claim as new and desire to secure by Letters Patent is:

1. In a vehicle tire shoe, the combination with a series of metallic sections each covering substantially a quarter of the outer circumference of the tire and having slots, of a resilient band fitting on the outer face of the metallic sections to form the tread for the wheel, and pins passing from one section through the slots of the adjacent sections, and bolts securing the sections of the band.

2. In a shoe for tires, the combination of metallic sections enveloping the tread portion of a pneumatic tire, a metal band constituting the tread of the tire, said metallic sections being formed so as to provide flat seats for said band, and removable means for connecting the seats and band.

In testimony whereof I affix my signature in presence of two witnesses.

THOMAS F. BALDWIN.

Witnesses:
JAMES F. DUHAMEL,
GEO. A. SENIOR.